United States Patent Office 3,010,539
Patented Nov. 28, 1961

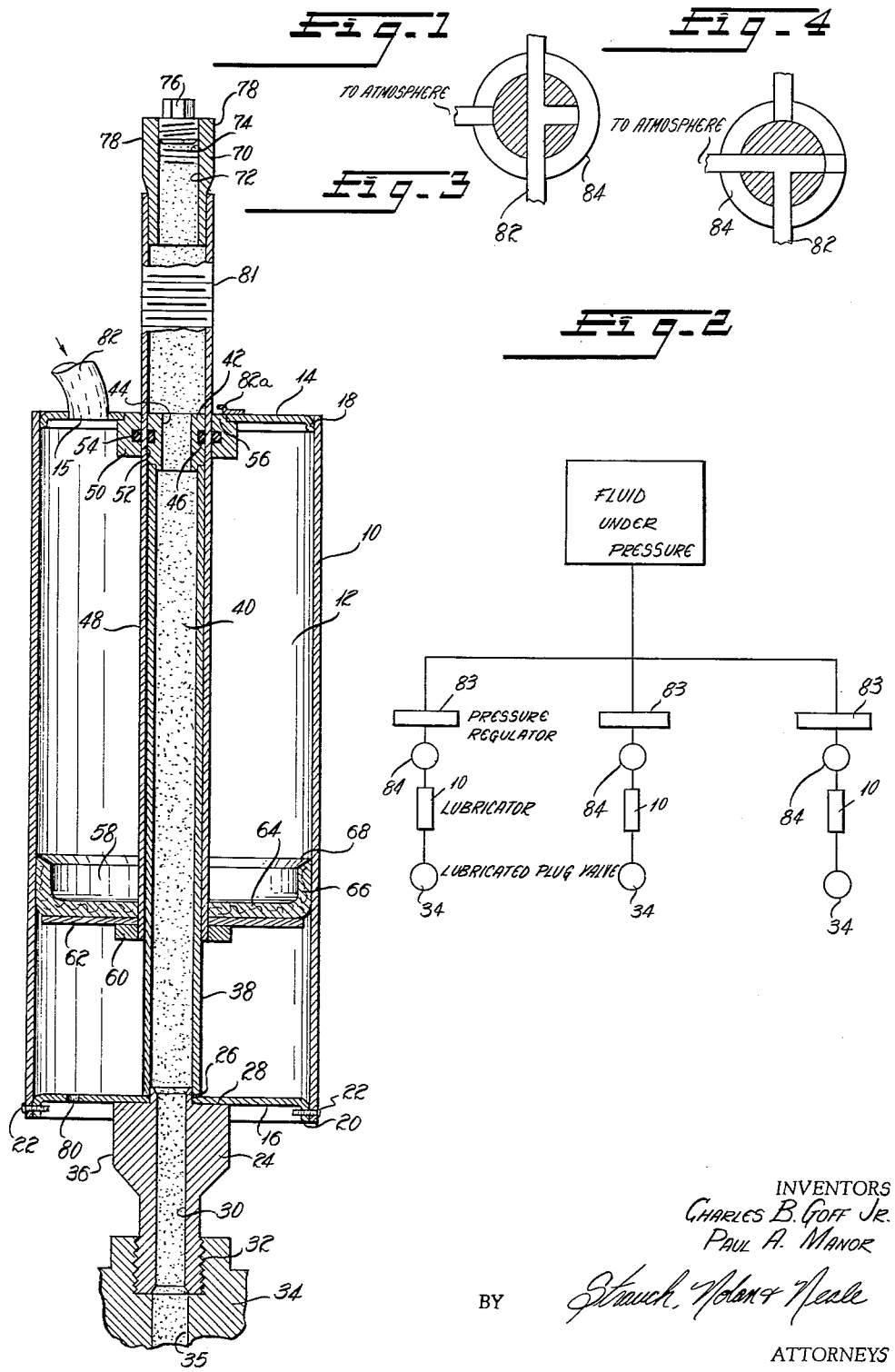

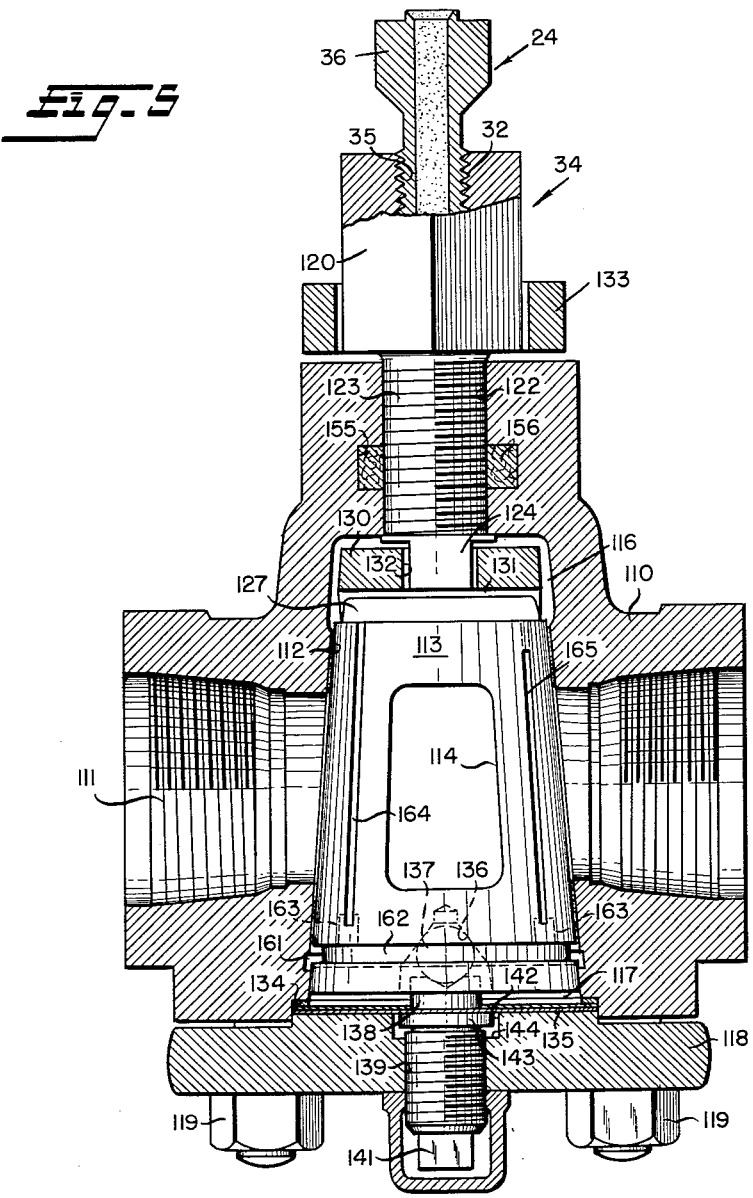

3,010,539
AUTOMATIC VALVE LUBRICATION
Charles B. Goff, Jr., Allison Park, Pa., and Paul A. Manor, Akron, Ohio, assignors to Rockwell Manufacturing Company, Pittsburgh, Pa., a corporation of Pennsylvania
Filed May 15, 1957, Ser. No. 659,392
9 Claims. (Cl. 184—39)

This invention relates to automatic lubrication and more particularly to arrangements for introducing plastic lubricant into lubricated plug valves and the like to maintain a continuous uniform lubricant pressure within the valve.

Experience has shown that, under any of various operating conditions for each type and size of lubricated plug valve, there exists a range of optimum lubricant pressures which should be maintained for the most efficient operation of the valve. In the usual lubricated plug valve adjustment of the valve gland applies the proper seating pressure at the plug seats. A jacking pressure is exerted by increasing the lubricant pressure to overcome the plug seating pressure and separate the seating surfaces sufficiently for lubricant to move into the space therebetween. This lubricant is uniformly dispersed over the entire seating surface of the plug, and exists as a continuous thin film which both seals the space against leakage of line fluid and lubricates the valve plug for turning. The lubricant pressure must be sufficiently large to resist entry of line fluid pressure into the space between the plug seating surfaces but it must not be so great as to expel the lubricant into the pipe line.

During normal operation of the valve, the lubricant film is deteriorated by forces such as erosion, solubility of the lubricant in the line fluid, high temperature effects and the like. This depletion of lubricant soon results in a drop in lubricant pressure within the valve. In manually lubricated valves, the lubricant film is renewed and the pressure is returned to its proper valve by adding lubricant with a grease gun or by turning a lubricant screw that is usually provided in the stem of the valve plug. Various means have been proposed to automatically offset the drop in pressure when lubricant is lost such as is illustrated and described in U.S. Patent 2,042,067, issued May 26, 1936, wherein a lubricant screw in combination with a compressed spring exerts a pressure on the lubricant stored in the reservoir. Such devices are effective in forcing lubricant from the reservoir, but the pressure is not uniform as lubricant is used during operation of the valve because when the spring is under full compression the pressure exerted is greatest and gradually decreases as the spring expands to replace the expended lubricant.

Another problem with such spring actuated automatic lubricators is that the amount of pressure applied is limited by the capacity of the spring. Also when a change in pressure capacity is desired, it is necessary to change the spring accordingly. These devices are also expensive and require modification of standard commercial valve construction.

The invention provides a special arrangement for maintaining a constant lubricant pressure within the valve available to automatically continuously repair deterioration of and renew the film between the plug seating surfaces during valve operating conditions, and that is the major object of the invention.

Another object of this invention is to provide a lubricator operated by fluid pressure which will supply a lubricant to a surface to be lubricated at a controlled continuous and constantly uniform pressure.

A further object of the invention is to provide a lubricator particularly suited for plug valves which will maintain the lubricant in the reservoir and on the plug and sealing surfaces of the valve at a controlled, continuous and constantly uniform pressure.

A further object is to provide a novel collapsible chamber plug valve lubricator.

Another object of the invention is to provide a system for lubricating a plurality of different surfaces by means of a plurality of novel lubricators, the lubricators being operated by a single source of fluid pressure, the fluid pressure supplied to each lubricator being controlled whereby lubricant is supplied to each surface to be lubricated at a desired continuous and constantly uniform pressure.

Other objects of the invention will, in part, be obvious, and will, in part, appear hereinafter.

For a fuller understanding of the nature and the objects of the invention, reference should be had to the following detailed description and drawing, in which:

FIGURE 1 is a transverse sectional view of the lubricator mounted on the stem of a lubricated plug valve;

FIGURE 2 is a flow diagram of a lubricating system;

FIGURES 3 and 4 are similar views showing the valve of FIGURE 2 in different positions; and FIGURE 5 is a partially sectional side view of a plug valve to which the lubricator of the instant invention is connected.

Referring to FIGURE 1, there is illustrated a lubricator having a cylindrical casing 10 which encloses a fluid pressure chamber 12. The cylindrical casing 10 is closed at the top by a fixed annular plate 14 and at the bottom by a fixed annular plate 16. The outer periphery of the plate 14 has an annular rim 18 which is brazed to the casing 10 to provide a fluid tight joint. The bottom plate 16 has a similar annular rim 20. The plate 16 is secured in position by means of a plurality of pins or rivets 22 which are secured in aligned holes in the casing 10 and the annular rim 20. A fluid under pressure, such as compressed air is supplied from a suitable source to the pressure chamber 12 through opening 15 in top plate 14. A fitting 24 for mounting the lubricator on a plug valve is brazed to the bottom plate 16. A strong and durable structure is assured by an annular axial extension 26 which forms a flat shoulder 28 with the body of fitting 24. Fitting 24 has an axial bore 30 and a reduced diameter externally threaded portion 32 at its lower end for mounting the lubricator on the stem 34 of a conventional valve (not shown) plug having a passage 35 leading to the seating surfaces of the plug on the valve body. The plug valve structure for example may be that disclosed in Patent No. 2,204,440. Referring to FIGURE 5, the plug valve comprises a body or casing 110 provided with a passageway 111 therethrough for flow of line fluid. A tapered bore 112 which forms a tapered or conical seat is formed in the casing transversely of the passageway 111, and a frusto conical plug 113 provided with a hole or port 114 therethrough which is adapted to register with passageway 111 in open position is seated in said seat. A lubricant chamber 116 is provided at the smaller end of the plug, and the larger end of the seat is closed by a metal cover plate 118 of cast or forged steel held in place at its margin by studs or bolts 119 and providing a chamber 117 between the cover and larger end of the plug.

The casing is extended at the smaller end of the seat and has a threaded hole 122 bored and tapped therethrough extending from the exterior to the chamber 116. An operating stem 34 squared at its outer end has a threaded portion 123 extending through said bore, and at the inner end of the stem there is a tongue or extension 124, the purpose of which will hereinafter appear. The threaded portion 123 of the stem 34 has an accurately machined running thread which co-operates with similar threads in the wall of hole 122 in the casing, and a very close fit between the threads therefore is provided.

The tapered plug 113 as shown forms one wall of chamber 116 and extends partly into this chamber, and a tongue 127 is integrally formed at its smaller end. An equalizer 130 has a correspondingly shaped lateral groove 131 formed diametrically therethrough and is adapted to rest on the smaller end of the plug with the tongue 127 projecting into the groove 131 thereof. A hole 132 of generally rectangular shape is formed axially through the equalizer, and in assembled position the tongue 124 of the stem projects into the hole 132 in the equalizer, and a sufficient clearance is provided in hole 132 and groove 131 so that there is a small amount of play at these points. A collar 133 is secured to the squared end of the stem 34 and is held in place by any suitable means, such as a set screw. From the description so far pursued, it will be apparent that the lug 113 can be rotated in its seat by rotation of the operating stem 34, the co-operating threads on the stem and casing advancing the stem into the chamber 116, and sufficient clearance is provided between the stem and the top of the equalizer 130 to provide for this movement without exerting any thrust on the plug.

A suitable internal step 134 is formed in the casing adjacent the larger end of the seat, and a diaphragm designated generally by the numeral 135 is located thereon and is clamped between the cover 118 and shoulder 134, a suitable gasket being employed to provide a tight joint. The plug 113 has a conical recess 136 in its large end in which is located a steel thrust ball 137, and a thrust disk 138 having a suitable recess therein is located between the ball and diaphragm 135 and is adapted to bear on the ball. The cover 118 has a threaded bore 139 therein adapted to receive the threaded adjusting screw 141, and a counterbore 142 in the cover receives a second thrust disk 143 and provides a shoulder 144 to limit outward movement thereof. The cover 118 bears on the plug through the intermediary of adjusting screw 141, disk 143, diaphragm 135, disk 138 and the ball 137. The seating pressure on the plug in its seat is adjusted by turning inwardly the threaded plug 141 which tends to bow the cover outwardly and thereby exerts a reacting thrust through the diaphragm 135 and thrust disks 143 and 138 which is transmitted by ball 137 to the plug. Turning the threaded plug 141 inwardly increases the seating pressure of the resilient cover 118, and turning the threaded plug outwardly relieves the pressure.

The threads on stem 34 co-operate with the threads on the hole 122 to form sealing surfaces which are sealed against escape of line fluid or pressure by means of a suitable viscous lubricant supplied thereto from chamber 116. Operating stem 34 has a bore 35 threaded at its upper end adapted to threadingly receive the threaded end 32 of fitting 24 carried by the lubricator of the instant invention. The fitting 24 has a hexagonally shaped portion 36 adapted to receive a wrench for conveniently mounting the lubricator on the plug stem. Lubricant under continually effective pressure of constant magnitude is introduced into chamber 116 from the lubricator through the bore in operating stem 34. Because of the close fit between the threads 123 on the operating stem and in the hole 122, which form sealing surfaces, the outward flow of viscous lubricant from the chamber 116 is resisted so that the lubricant between these threads forms a primary seal. A secondary seal comprising a packing chamber 155 containing packing 156 under pressure around the stem is provided to prevent outward escape of lubricant, and the lubricant which works its way out along the stem assists in lubricating and sealing the packing.

Sufficient pressure can be generated by the lubricator of the instant invention so that the pressure of the lubricant in chamber 116 will jack the plug 113 slightly off its seat against the opposing thrust of the resilient cover 118. Also lubricant is supplied from the chamber 116 through suitable grooves to the seating surface of the plug and casing to provide a substantially complete seal around the passageway 111 through the casing in fully open and closed positions. An annular recess 161 is provided in the seat adjacent its larger end, and a similar annular recess 162 directly opposite the former may be provided in the plug to enable proper lapping of the plug in its seat. A series of four dwarf connecting grooves 163 is provided in the seating surface of the casing and in fully open and closed position these dwarf grooves are adapted to connect with the longitudinal grooves 164 and 165 in the plug surface. Two such pairs of longitudinal grooves are provided, the grooves 164 being diametrically opposite and extending substantially the full length of the space between the chamber 116 and the dwarf grooves 163 and the pair of diametrically opposite shorter grooves 165 being connected or overlapped with the dwarf grooves 163 but terminating at the smaller end of the plug just short of the lubricant chamber 116.

Fixed on the annular extension 26 is a stationary tubular section 38 of a telescoping lubricant reservoir 40. The reservoir 40 is in alignment with bore 30. Secured to the upper end of the stationary tubular section 38 is an annular adapter 42. The adapter 42 is substantially cylindrical with an axial bore 44 in alignment with the lubricant reservoir 40. An annular external groove in the adapter 42 seats an O-ring 46 of rubber or the like.

Slidably mounted upon and about the stationary section 38 of telescoping lubricant reservoir 40 is a second tubular section 48. Tube 48 slidably surrounds adapter 42. A fluid tight seal is provided at the point in the top plate 14 where sliding tubular section 48 emerges from the pressure chamber 12 by means of an annular adapter 50. The adapter 50 is substantially cylindrical with an axial bore 52 which slidably receives tube 48. An annular groove in the adapter 50 contains an O-ring 54 of rubber or the like. The adapter 50 has a reduced portion 56 to allow insertion of the adapter within the central opening in top plate 14. The depth of reduced portion 56 is equal to the thickness of plate 14 so that a flat continuous surface is provided and plate 14 is there fixed to adapter 50 as by brazing.

Thus sliding movement of tube 48 is both guided and sealed by the coaxial adapter ring and O-ring assembly at the top of casing 10. The radially compressed O-ring resiliently seals against escape of pressure while at the same time offering no frictional resistance to sliding of tube 48.

Mounted on the lower end of the sliding tubular section 48 is a piston assembly 58. Piston assembly 58 comprises an annular shoulder member 60 fixed on the lower end of sliding tube 48. The shoulder member 60 acts as an abutment for a rigid supporting disk 62 which is loosely mounted on tube 48 by means of a central opening in the disk. The disk 62 supports a cup shaped leather washer or piston 64 which has an outside diameter of sufficient dimension to assure a snug fit against the walls of fluid pressure chamber 12. The piston 64 has upwardly extending walls 66 which are slightly beveled at 68 to help maintain the sealing relation between the piston and the interior walls of the pressure chamber. The piston 64 fits snugly in fixed and sealing relationship against the sliding tube 48.

Rigidly attached to the outer end of tube 48 is a lubricant fitting adapter 70. The adapter 70 has an axial bore 72 extending therethrough and a threaded portion 74 to receive a plug 76, or a lubricant introduction fitting of the type for example illustrated and described in U.S. Patent No. 2,776,026, issued January 1, 1957. The adapter 70 has milled flats 78 to allow the adapter to be held by a wrench while the plug 76 or a lubricant fitting such as described in the above patent is being threaded into position.

In operation, the lubricator as illustrated may be mounted on a lubricated plug valve such as the type illustrated and described in U.S. Patent No. 2,204,440. To fill the lubricator, plug 76 is removed and a lubricant gun (not shown) is coupled to the adapter 70. When the lubricator is empty or in need of being refilled, the piston assembly 58 is at the bottom of pressure chamber 12 near plate 16. The reservoir 40 is charged with lubricant by forcing lubricant through the bore 72 of the adapter 70, through the bore 30 of the valve fitting 36, and finally into the lubricant chamber, grooves and seating surfaces of the plug valve itself. As all of these passages are filled with lubricant, the lubricant pressure therein will increase. This pressure will react to expand the telescoping reservoir 40 and raise the piston assembly 58 as the reservoir is filled. An air vent 80 provided in the bottom plate 16 and the opening 15 which is adapted to receive a fluid pressure line in top plate 14 allow the piston assembly 58 and the sliding tubular section 48 to move freely up the stationary tubular section 38 during the lubricant filling operation. When the reservoir 40 is completely filled with lubricant, the tube 48 will project upwardly from the casing 10 and the piston assembly 58 will abut against the top plate 14.

When the piston assembly 58 has reached its uppermost position, the lubricant gun (not shown) is disconnected, plug 76 replaced, and a fluid pressure line 82 is connected to the opening 15 in the top of plate 14. When fluid such as compressed air is introduced into pressure chamber 12, the piston assembly 58 is urged downwardly. Since lubricant can now escape from reservoir 40 only through passageway 30, pressure is transmitted through the valve lubricant passageways to the plug seating surfaces. The pressure may be controlled as desired by varying the pressure at the source or by the use of a pressure regulator in the line 82 between the source and the lubricator.

In the assembly illustrated, the piston area is about twenty times that of the cross sectional area of the internal bore of tubular section 48 of reservoir 40, and thus the pressure of the lubricant at the plug seating surface is 20 times that of the pressure exerted on the piston. The air pressure on the top of piston 58 is set for equilibrium with the lubricant back pressure. When lubricant is lost from the plug surface during valve service, the valve lubricant pressure drops, and the maintained air pressure on piston 58 will immediately displace more lubricant into the valve system until it is fully lubricated with the sealing surface film renewed, at which point the lubricant pressure rebalances the air pressure on the piston.

As can be seen in FIGURE 1, if it is necessary to replace any of the parts of the lubricator, it may be readily disassembled by merely removing the pins 22.

The amount that the sliding tube 48 projects from the casing 10 provides a ready and simple means of determining the amount of lubricant remaining in the lubricator. The portion of tube 48 which extends from casing 10 may be calibrated, and marked as at 81 to coact with a stationary index 82a on plate 14 to accurately indicate the amount of lubricant remaining in the reservoir.

By the use of the system illustrated in FIGURE 2 of the drawing, the same source of fluid pressure may be used to operate a plurality of lubricators requiring different fluid pressures. This is accomplished by introducing a pressure regulator 83 into each line leading from the fluid source to a lubricator. With the use of pressure regulators as illustrated, the fluid pressure in each lubricator can be controlled very accurately. To facilitate filling the chamber 40 in any one lubricator with lubricant without interrupting the supply of fluid pressure to the other lubricators, a three-way valve 84 is provided in the line between each pressure regulator and its lubricator.

With the valve in the position shown in FIGURE 3, the lubricator is connected to the pressure regulator and the source of fluid pressure for normal operation. When it is desired to refill the chamber 40 with lubricant, the three-way valve is moved to the position shown in FIGURE 4. The chamber 12 is now vented to atmosphere through the three-way valve and lubricant may be forced into the chamber 40 in the manner above described.

The invention provides a system wherein maintenance of the valves is reduced, ease of operation is at all times improved, damage due to neglected lubrication is eliminated and the valve plug sealing is always properly maintained. The lubricator is a relatively low cost attachment to existing valves and readily installed in the field with no modification of structure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve assembly of the type characterized by a plug rotatable on seating surfaces on the body and a stem on the plug having a lubricant conducting passage connected to grooves leading to and terminating at said seating surfaces, the plug and seating surfaces being biased toward engagement under all operative conditions of the valve assembly, fluid pressure actuated means for automatically and constantly maintaining the lubricant film between said plug and said seating surfaces at a predetermined optimum thickness and maintaining said film under a predetermined pressure by constant replacement of lost lubricant comprising a fluid pressure chamber, a telescoping tubular lubricant reservoir mounted longitudinally in said pressure chamber and operably connected to said stem in fluid communication with said stem passage, said telescoping reservoir having a stationary section rigidly mounted adjacent an end of said pressure chamber and a movable section slidably fitting over the stationary section with an end thereof extending out the opposite end of said pressure chamber, fluid sealing means disposed between said movable section and the end of said fluid pressure chamber through which the movable section extends, normally closed means providing a lubricant admission inlet fitting on the end of said movable section extending out the pressure chamber, a piston mounted in said pressure chamber rigid with said movable section, means for maintaining fluid under substantially constant pressure into said pressure chamber above said piston in said pressure chamber during all operative conditions of said lubricant film maintaining means, said piston being movably responsive to fluid pressure in the pressure chamber and to the lubricant pressure in said reservoir to reduce the volume of said telescoping lubricant reservoir to force the lubricant therefrom to between said plug valve seating surfaces in an amount to normally attain equilibrium with lubricant back pressure in said valve assembly, said pressure acting to immediately displace lubricant from said reservoir into the valve assembly when lubricant is lost from said seating surfaces or grooves and said back pressure is reduced until equilibrium is once more attained.

2. The assembly of claim 1 wherein the portion of said movable section of said telescoping lubricant reservoir extending from said pressure chamber has indicia thereon cooperating with said pressure chamber to indicate the amount of lubricant in said reservoir.

3. A system for maintaining a plastic lubricant in a plurality of plug valve assemblies at a constantly uniform pressure, said plug valve assemblies being of the type characterized by a plug rotatable on seating surfaces on the body and a stem on the plug having a lubricant conducting passage connected to grooves leading to and at said seating surfaces, the system comprising a source of fluid under pressure, at least one line leading from said source for conducting said fluid to a like plurality of fluid pressure actuated lubricators connected to the line and each associated with one of said plug valve assemblies, each of said lubricators comprising a cylindrical fluid pressure chamber, a telescoping tubular lubricant reservoir mounted longitudinally in said pressure chamber and operably connected to said stem in fluid communication with said stem passage, said telescoping reservoir having a stationary section rigidly mounted adjacent an end of said pressure chamber and a movable section slidably fitting over the stationary section with an end thereof extending out the opposition end of said pressure chamber, fluid sealing means disposed between said movable section and the end of said fluid pressure chamber through which the movable section extends, normally closed means providing a lubricant admission inlet fitting on the end of said movable section extending out the pressure chamber, a piston mounted in said pressure chamber rigid with said movable section, means for introducing fluid under substantially constant pressure into said pressure chamber above said piston, said piston being movably responsive to fluid pressure in the pressure chamber to reduce the volume of said telescoping lubricant reservoir to force the lubricant therefrom to between said plug valve seating surfaces in an amount to normally attain equilibrium with lubricant back pressure in said valve assembly, said pressure acting to immediately displace lubricant from said reservoir into the valve assembly when lubricant is lost from said seating surfaces or grooves and said back pressure is reduced until equilibrium is once more attained.

4. The system of claim 3 in which a pressure regulator is connected into the line between said lubricators and the source of fluid to supply fluid to said pressure chamber at a desired uniform pressure.

5. In an automatic fluid pressure actuated lubricator for plug valves, a tubular reservoir member comprising two telescoped tubular sections, one adapted for connection in fluid communication with the lubricant passages and lubricant and sealant film between the plug and seat of a resiliently seated plug valve to be maintained under lubrication and the other adapted for filling the reservoir with lubricant, means defining a fluid pressure chamber surrounding said reservoir member, a piston in said chamber fixed to one of said reservoir sections, means for introducing lubricant under pressure into said reservoir member to fill said reservoir member and expand said reservoir member toward its maximum capacity by extension of said sections, and means establishing and for maintaining in said chamber a constant fluid pressure normally balancing the back pressure of the lubricant distribution system of the valve to which it is connected corresponding to a predetermined plug to seat spacing and lubricant film thickness, said constant fluid pressure being operable through said piston whenever said back pressure tends toward reduction in magnitude to relatively move said sections toward each other to displace lubricant therefrom through said opening to maintain said back pressure in balance with said constant fluid pressure.

6. In the automatic lubricator defined in claim 5, the area of said piston exposed to said constant fluid pressure being appreciably larger than the cross-sectional area of said reservoir whereby very high unit pressure is applied to said lubricant in the reservoir.

7. In combination, a plurality of lubricated plug valves each embodying a ported plug rotatable relative to a body seat between open and closed positions and means biasing the plug and seat toward surface to surface seating contact, a single source of fluid under pressure, a like plurality of fluid pressure actuated means each associated with one of said valves for maintaining a thin film of lubricant between the plug and seat of the associated valve of substantially constant optimum thickness and under a continuously applied constant pressure during movement of and in all operative positions of the plug of such valve, means connecting each of said fluid pressure actuated means to said source, and means in said connecting means for regulating to a constant magnitude the pressure applied to each of said fluid pressure actuated means such that the film will be maintained without extrusion from between the plug and seat into the associated line.

8. In combination, a lubricated plug valve embodying a ported plug rotatable relative to a body seat between open and closed positions and means biasing the plug and seat toward surface to surface seating contact, a source of fluid regulated to a constant pressure, a fluid pressure actuated means connected to said valve and said source for maintaining a thin film of predetermined thickness of lubricant between the plug and seat of the valve in an equilibrium condition of substantially optimum constant thickness and pressure under the counteraction of said biasing means and the line pressure in said valve with the pressure continuously applied to such lubricant from said source during movement of and in all operative positions of the plug of said valve whereby the thickness of said film will be maintained substantially constant between the opposed surfaces of said seat and plug without extrusion of lubricant from between the plug and seat into the line.

9. The combination defined in claim 8 wherein said plug has a stem operably connected thereto, wherein said fluid pressure actuated means and said source of fluid regulated to a constant pressure are located externally of said valve, and wherein said fluid pressure actuated means is connected to the opposed surfaces of said seat and plug by lubricant conducting passages extending through said stem and connected to grooves in the surface of said plug.

References Cited in the file of this patent

UNITED STATES PATENTS

| | | |
|---|---|---|
| 960,341 | Kincaid | June 7, 1910 |
| 1,633,357 | Albertine | June 21, 1927 |
| 1,717,543 | Barricklow | June 18, 1929 |
| 1,750,701 | Brauer | Mar. 18, 1930 |
| 2,042,067 | Leach | May 26, 1936 |
| 2,086,725 | McCausland | July 13, 1939 |
| 2,501,946 | Jacobsen | Mar. 28, 1950 |
| 2,505,970 | Jacobsen | May 2, 1950 |
| 2,881,785 | Dotter | Apr. 14, 1959 |